UNITED STATES PATENT OFFICE.

DAVID A. WELLS, OF CAMBRIDGE, MASSACHUSETTS.

IMPROVEMENT IN THE PREPARATION OF VEGETABLE FIBER.

Specification forming part of Letters Patent No. 10,727, dated April 4, 1854.

*To all whom it may concern:*

Be it known that I, DAVID A. WELLS, of Cambridge, in the county of Middlesex, Massachusetts, have invented certain new and useful Improvements in the Process for Obtaining Cellulose from Vegetable Substances, taken either in the natural state or after they have been employed in the arts, and preparing the same for the manufacture of paper or for other purposes; and I do hereby declare that the following is a full, clear, and exact description of the same.

The substance which I propose to extract from various plants for manufacturing paper and other purposes is cellulose.

Many attempts have been made to reduce straw, hay, corn leaves and husks, and other plants into a pulp suitable for the manufacture of paper, but with very little success. In many instances no mention is made of the particular constituent of the plant to be obtained for this purpose, and in others lignine is mentioned, and in all cases that have come under my inspection the specimens have exhibited the presence of unreduced lignine.

Cellulose has long been recognized by chemists as a distinct proximate constituent of the cellular structure of plants, and is often found more or less pure in the natural state, as in the fibers of flax and cotton when prepared for making paper.

Lignine differs in many essential particulars from cellulose. It contains more carbon, and I find all its varieties to be soluble in potash, soda, ammonia, and alcohol, while cellulose is very slightly, if at all, soluble in the caustic alkalies, and not at all soluble in lime, baryta, strontia, or magnesia. So far as chemical experiments and experience have put the matter to the test, cellulose is the best substance known for making paper on account of its great durability. It is often found in great quantities in the cellular structure of plants, whose external structure would scarcely indicate its presence, and my process presents the means of detecting its presence by chemical agents, however it may be surrounded by membranous and other structures.

It is important to the making of good paper that the cellulose should be entirely separated from the lignine and other constituents of the plant.

By my process I am enabled to obtain cellulose from materials apparently destitute of fibrous structure, and therefore the sources of its production are increased to an unlimited extent, as it may be obtained from all stalks, stems, grasses, bark, and woody fibers; and as it can be obtained from substances in their natural and crude state the production of pulp for the manufacture of good paper will be greatly cheapened.

I have found that caustic alkalies, and, still better, alkalies kept caustic, act very slightly, if at all, on cellulose, and that the alkaline earths—such as lime, baryta, strontia, and magnesia—unite with and remove from the caustic alkali those substances which, dissolved from natural tissues, would interfere with its continuous action.

I have found, also, that some vegetable substances from which the natural color has not heretofore been successfully removed, and such as have been employed in the arts—such as tarred ropes, manilla stock of every description, jute, gunny bags, dark-colored rags, and other such like materials—can be successfully treated by my improved process, and then successfully bleached if previously steeped in sulphuric or muriatic acids.

The nature of my invention consists in steeping such substances in sulphuric or muriatic acids, marking about from 3° to 5° Baumé at a temperature from 80° to 212° Fahrenheit, for twelve to twenty-four hours, thus preparing them and acting upon them in such a manner that they will yield to the subsequent processes.

My invention for the reduction of plants to obtain cellulose from them for making pulp to be manufactured into paper, and for other purposes, consists in subjecting plants to the chemical action of a soluble caustic alkali so weak that it shall dissolve lime and other alkaline earths, for the purpose of dissolving the other constituents of the plants, when this is combined with the use of lime or other alkaline earth to separate from the caustic alkali the substances dissolved by it, and thus retain it in or restore it to the caustic state, whereby I am enabled to obtain cellulose in the pure state at very little cost, and to render the process continuous and easily managed on a large scale, while at the same time the alkaline earth or earths employed to preserve or restore the caustic state by its union with the organic substances separated from the plants will produce a good manure.

My invention also consists in subjecting the vegetable substance, after it has been subjected to caustic alkalies and alkaline earths, to the dissolving action of sulphuric or muriatic acids, by which extraneous matters are removed or precipitated, and nitrogenous compounds decomposed, so that subsequent bleaching operations are rendered economical; and my invention also consists in breaking up the texture of the vegetable matter after it has been treated as above by subjecting it to the action of a solution of the efflorescent salts—such as sulphate of soda—and then drying and subsequently washing the product.

The mode of procedure which I have tried with success is as follows: If the substance from which cellulose is to be obtained is either manilla stock, tarred ropes, jute, gunny bags, colored rags, particularly such as have been dyed with colors having metallic bases, or other such like substances, they are to be steeped for the space of about twenty-four hours in sulphuric or other mineral acid marking about from 3° to 5° Baumé at from 80° to 212° Fahrenheit. It is then carefully washed and treated by the other branches of the process like other vegetable substances that do not require the previous step.

The substances treated as above, or any other plant—such as straw, hay, corn-leaves, &c.—are treated in the following manner to obtain cellulose: A solution of perfectly-caustic soda, specific gravity from 1.008 to 1.074, at 60° Fahrenheit, marking from 1½° to 10° Baumé, is introduced into a boiler similar to that used in bleaching cotton goods, or other suitable boiler heated by fire or steam-pipes, and made to boil. Then introduce four or more pounds of dry caustic lime, slaked to a dry powder, for every hundred pounds of material to be operated upon, and then put upon the false bottom of the boiler as much hay, straw, torn gunny bags, jute, or any other plant or substance obtained from plants containing cellulose as the space above the false bottom will contain. The boiling causes the liquid to circulate through the mass, and as the boiling is continued the mass will be reduced in bulk, so that more can be put in. The boiling is to be continued until the mass exhibits a soft and glutinous appearance, or until the joints, knots, or larger parts of stalks can be crushed between the fingers. I have found that one gallon of liquor marking from 1½° to 10° Baumé is sufficient for one pound of hay, straw, or other light substance to be treated in the first parcel boiled, but may be used repeatedly. For heavier materials a less quantity will suffice. After boiling sufficiently the fluid is drawn off from the bottom of the kettle, together with the organic compounds of lime, which are highly colored, into a receiving-cistern. A quantity of cold water sufficient to make up the loss by evaporation or otherwise, to restore the quantity of alkaline liquid first introduced, is now carefully effused over the whole surface of the boiled mass resting upon the false bottom, and there suffered to percolate, and thus the material is partly washed before it is removed, and the adhering alkali is saved and united to the portion of liquid previously drawn off, and the original quantity thus restored. The lime used in this boiling operation becomes highly charged with all those substances which, like fatty matters, starch, and humic compounds, can be precipitated in a solid state with it, and is therefore left at the conclusion of the process in combination with those substances which are most valuable as food for plants, and which therefor can be employed advantageously as manure. The substance left is cellulose, and is now in the best state to produce long or linen-like fibers; but if it is desired to obtain cellulose having a greater resemblance to purified cotton the boiling must be continued about four hours, or until the fiber is reduced in length. It must be remembered, however, that the two forms of cellulose, when produced, have the same chemical composition, and only differ mechanically. The material thus produced is now taken to any suitable washing apparatus, such as are used for washing wool being preferable, in my judgment, and there washed until the wash-water is no longer colored, and until nearly all traces of alkaline earth are removed. The mass is then transferred to a wooden tub or cistern containing muriatic (hydrochloric) or sulphuric acid marking 2° to 3° Baumé, and there kept from one to two hours. The quantity of acid to be used in the liquor must be such that at the end of the time specified the liquor shall be slightly acid to the taste. The acid liquor is then drawn off through a strainer and the mass carefully washed. It is then directly transferred to a clear solution of bleaching-powders (hypochlorite of lime) marking from 1° to 3° Baumé, and there kept under the surface and occasionally stirred until sufficiently bleached. If the solution be not sufficiently strong, more clear solution of bleaching-powders is to be added, the intention being always to leave a slight styptic taste to the bleaching-liquor when the full degree of whiteness appears. The material should then be thoroughly washed, and if it be desired to remove all odor of chlorine it may be treated with sulphites, (anti-chlorine,) as is often done with other paper-stock. After this it may be submitted to pressure in ordinary presses, all contact with metal being carefully avoided. If intended for immediate use for the manufacture of paper, the bleached pulp can enter the engines in the same way as pulp now prepared from rags. The liquid which has passed into the receiving-cistern, having become clear, is to be pumped into the kettle or boiler from which it was drawn and treated with the same weight or volume of slaked lime as was before used, and successive portions of fresh material may be acted on as in the first instance by the same liquor, until the soda contained in it has lost its power and activity, when a fresh portion must be substituted. It will be seen that in these operations the most of the alkali positively consumed is in the form of caustic lime, and this is rendered valuable as a fertilizer from its having taken up a large amount of organic matter, and thus becomes fitted for the support of vegetation. The small quantity of acid required is consumed, as is also the bleaching-liquor; but the care of the manufacture will guard against any excessive loss. Such is a general process.

If it be the object of the manufacturer to obtain from non-fibrous material cellulose in its fibrous form presenting the greatest strength, the boiling in the soda-lime must be continuously kept up and stopped short of the point where the whole would take the form of an emulsion, and so in the succeeding operation of bleaching. If the bleaching-liquors are in excessive quantity or strength, the fibers, after bleaching, become disintegrated and shortened. On the contrary, when the short fiber and opaque appearance of cotton are desired the boiling should be continued until the tissues are more completely broken up, and in the bleaching operation a small excess of hypochlorite of lime should be present, and a longer time allowed for the effect to be produced. The breaking up of the more closely compacted vegetable structure is effected by introducing the boiled mass resulting from the first operation into a strong solution of sulphate of soda or other efflorescent salts, and drying it exposed to the air. As it dries the fibers become separated and shortened; but the usual mechanical means for breaking it up are in most cases amply sufficient. The cementing-matter and other like substances present in vegetable tissues, together with the crenic, apocrenic, and humic acids produced by the process from the vegetable structures, will yield to alkaline solutions, but, becoming condensed in such solutions in part, and in part retained by the vegetable material, a point is soon reached where the chemical action on the vegetable material ceases. In the attempts which have hitherto been made to obtain materials suitable for the manufacturing of paper this difficulty has not been overcome.

The cellulose prepared by the process above described requires very little mechanical power to reduce it to that pulpy state similar to that to which rags and other materials are now brought preparatory to its application to the paper-molds.

Owing to the state in which the cellulose is left by the process above described and claimed by me, the same mechanical power which would reduce a given quantity of ordinary paper-stock to that state fitted for application to the molds would reduce in at least half the time double the quantity of cellulose prepared as above to the same state. Any portions remaining firmly compacted after the beating of the cellulose in the engines will be subsequently separated by the knotters or strainers, and may, if desired, be used for the manufacture of paper of inferior quality. I find that all hollow stalks, finely divided tissues, and spongy-formed structures of vegetables are most easily acted upon, and the cellulose is obtained from such substances at the smallest expense.

It will be obvious from the foregoing that the mode of treatment may be greatly modified within the range of my process—as, for instance, after the liquor of caustic alkali has been employed for a time it may be renovated by introducing into it an alkaline earth to separate from the caustic alkali the substances which have been dissolved from the plant, so that the alkaline liquor may be employed over again. This modification is simply given as an indication of the various changes which may be made in the details of my process.

It will be understood from the above that some branches of my process may, under certain circumstances, be dispensed with—as, for instance, some substances need not be carried through the preliminary treatment with acids, as this is only required to remove bases which would not be acted upon effectually or at all by the subsequent branches of the process—such, for instance, as tar and colors having metallic bases; but if the substances are to be employed for making unbleached paper, manilla stock and dark-colored rags, and other substances having refractory colors, can be carried through the second branch of the process without the preliminary treatment in acids; but when such substances are to be used for making white paper it is important that they should be carried through all the branches of the process; and it will be also understood that the bleaching part of the process is not to be applied except when white cellulose is to be produced; and, as to the treatment with efflorescent salts, it only becomes necessary when short fibers are desired, and therefore may be dispensed with when applied to produce long fibers; and, finally, as to the treatment in acids after the treatment in caustic alkali and alkaline earths, this can be dispensed with if the product be not subjected to the bleaching process, as the object of this secondary treatment in acids is with the view to cheapen the bleaching process.

I do not claim broadly subjecting vegetable substances to the action of acids, as this has been done before for other purposes and under essentially different proportions and circumstances, and with a different view, and therefore I do not wish to be understood as claiming broadly subjecting vegetable substances to the action of acids except when used for the purpose of removing bases which would entirely or for too long a time resist the chemical action of the other branches of the process employed to obtain cellulose.

I am also aware that lignine has been separated from woody fiber by dissolving the cementing substances in alkalies more or less caustic as aids to subsequent mechanical operations for obtaining fibers, and I do not therefore claim simply subjecting vegetable substances to the action of caustic alkalies.

I am also aware that vegetable substances, after being subjected to the action of caustic alkalies, have been treated with acids, but under different circumstances and for a different object. Heretofore this has been done for the purpose of removing any adhering alkali and all other foreign matters, while in my process I use an acid of an entirely different strength, not for the purpose of removing any alkali remaining from the previous branch of the process, for this I previously wash out, and not for the purpose of removing any gummy or glutinous matter, for this I previously remove by means of the caustic alkali; but I have found that the cellulose treated with an acid of such a strength and for such a length of time is so altered that the subsequent bleaching by the ordinary means is greatly facilitated and cheapened, and therefore I do not claim broadly treating vegetable substances with acids after they have been subjected to the action of caustic alkalies, irrespective of the circumstances and the purposes herein specified.

Aware that acids have been used in the treatment of crude or unprepared vegetable fiber, chiefly for the purpose of breaking up and mechanically separating the woody and gummy matters, I do not therefore claim any such process; but What I regard as my invention is—

1. Removing coloring and resinous matters from cleaned and dressed flax, hemp, and other equivalent textile and fibrous materials designed to be spun, felted, &c., by means of weak acid of about $3°$ Baumé, in the manner as set forth.

2. In combination with the above, the employment of caustic alkalies, as specified, to obtain cellulose from vegetable substances for the manufacture of paper and for other purposes, in combination with the use of alkaline earths, substantially as specified, to preserve or restore the caustic state of the alkalies, as set forth.

3. In combination with the process for the separation of cellulose from vegetable substances, subjecting the products thereof to the action of a solution of efflorescent salts, substantially as and for the purpose specified.

DAVID A. WELLS.

In presence of—
CHAS. W. STOREY,
GEO. EATON.